C. L. PECK.
METHOD OF AND APPARATUS FOR TREATING WASTE LIQUORS.
APPLICATION FILED DEC. 1, 1919.
1,357,587.
Patented Nov. 2, 1920.
2 SHEETS—SHEET 1.
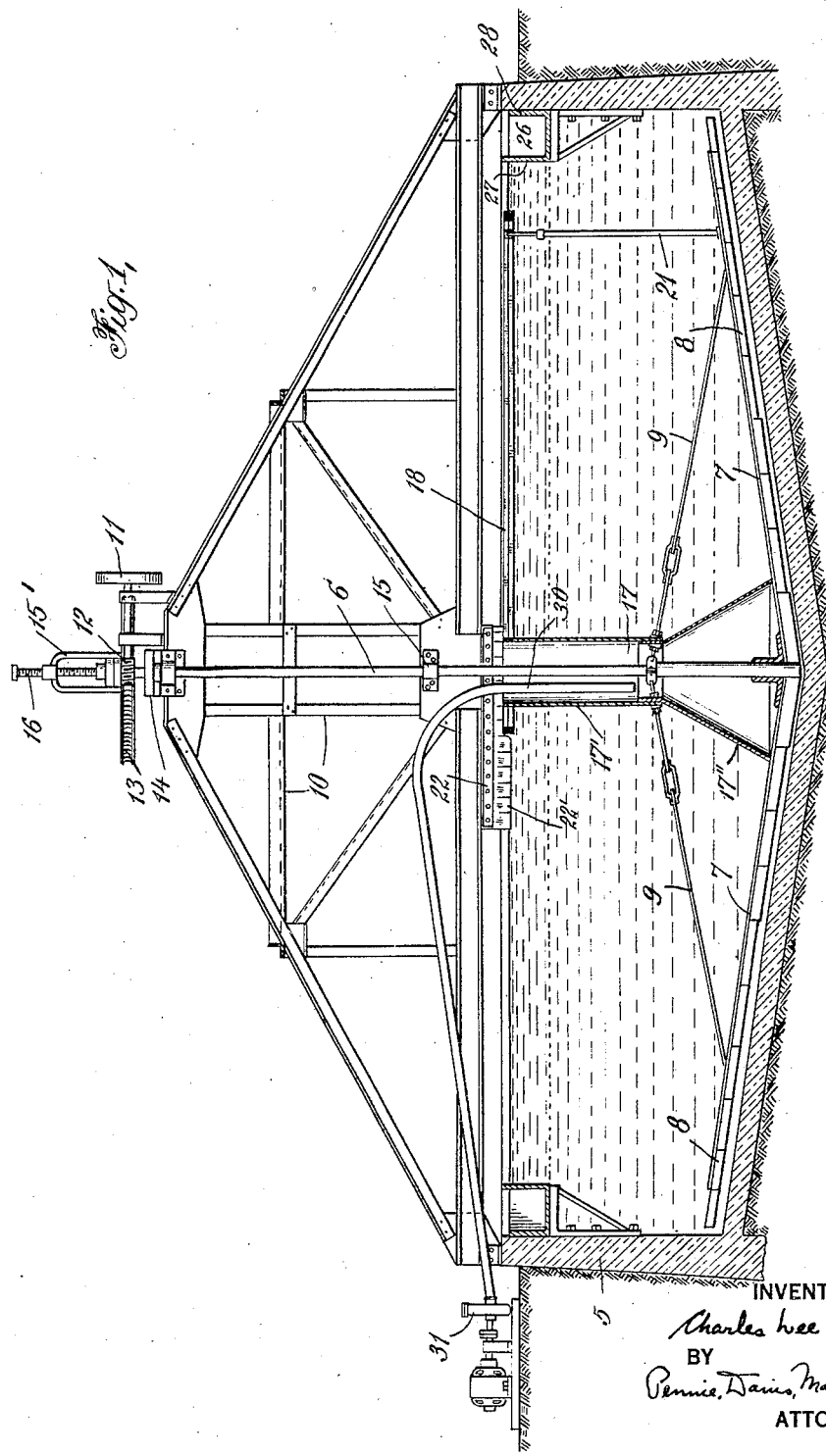
INVENTOR
Charles Lee Peck
BY
Pennie, Davis, Marvin & Edmonds
ATTORNEY C. L. PECK.
METHOD OF AND APPARATUS FOR TREATING WASTE LIQUORS.
APPLICATION FILED DEC. 1, 1919.
1,357,587.
Patented Nov. 2, 1920.
2 SHEETS—SHEET 2.
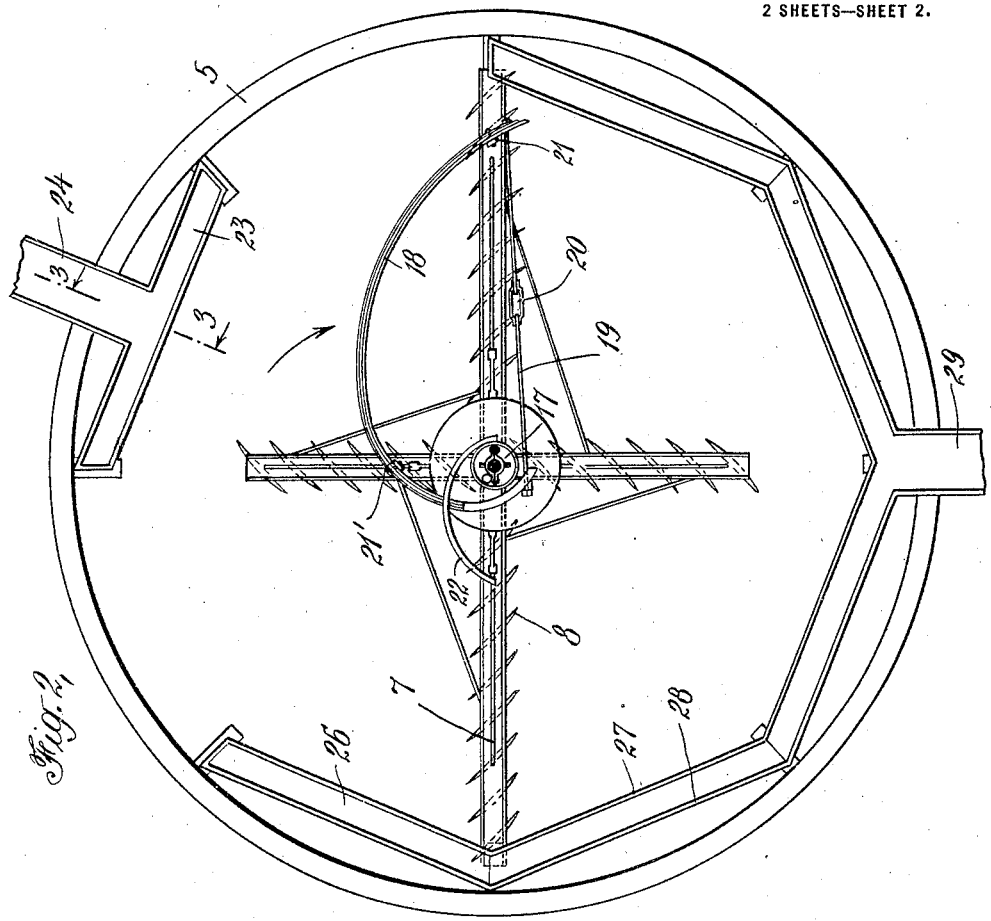
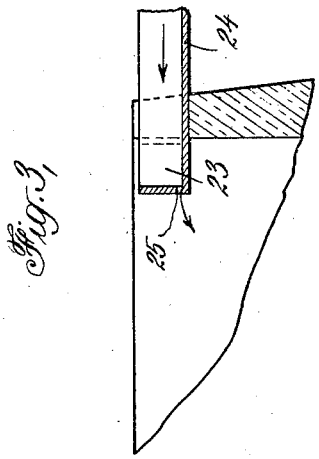
INVENTOR
Charles Lee Peck
BY
Pennie, Davis, Marvin + Edmonds
ATTORNEYS

UNITED STATES PATENT OFFICE.

CHARLES LEE PECK, OF NEW YORK, N. Y., ASSIGNOR TO THE DORR COMPANY, OF NEW YORK, N. Y., A CORPORATION OF DELAWARE.

METHOD OF AND APPARATUS FOR TREATING WASTE LIQUORS.

1,357,587.

Specification of Letters Patent.

Patented Nov. 2, 1920.

Application filed December 1, 1919. Serial No. 341,620.

*To all whom it may concern:*

Be it known that I, CHARLES LEE PECK, a citizen of the United States, residing at New York city, in the county of New York, State of New York, have invented certain new and useful Improvements in Methods of and Apparatus for Treating Waste Liquors; and I do hereby declare the following to be a full, clear, and exact description of the invention, such as will enable others skilled in the art to which it appertains to make and use the same.

This invention relates to the treatment of waste liquors containing floatable and settleable solids, such, for example, as sewage, trade waste liquors, and the like. The invention has for its objects the provision of an improved method of treating such liquors for removing floatable and settleable solids therefrom, as well as the provision of an improved apparatus particularly adapted for carrying out the method of the invention.

Ordinary sewage liquors, such as the usual town or municipal sewage liquors, as well as the waste liquors of many industrial operations contain solid substances some of which are lighter than the liquor and some of which are heavier than the liquor. These solid substances are usually of a putrescible character and their removal from the liquor before its discharge into running streams or rivers is not only desirable, but often necessary. Furthermore, these solid substances are frequently of commercial value, for example, they may be utilized in the manufacture of fertilizers and their removal or recovery from the liquor may on this account be made profitable.

The present invention is particularly concerned with the treatment of such waste liquors as contain both floatable and settleable solids which may, without prejudice, be subsequently treated together. In the case of some waste liquors, it is not desirable to mix the floatable and settleable solids, because one class of such solids may have a far greater commercial value than the other, or because the subsequent treatment of the combined floatable and settleable solids is difficult or objectionable. Where the collected solids are to be thrown away, as of no commercial value, or in general where both the floatable and settleable solids are of such a character as to be amenable to substantially similar treatment for the recovery of their valuable ingredients, as, for example, when both classes of solids are adapted to be worked into fertilizer material, I have found it advantageous to remove the floatable and settleable solids in combination, that is, together.

The method of the present invention accordingly contemplates subjecting a body of the liquor containing the floatable and settleable solids to a combined flotation and sedimentation treatment, whereby the heavier solids will settle and the lighter solids will rise and float on the surface of the liquor. Gravity alone is usually adequate to effect this flotation and sedimentation of the lighter and heavier particles, respectively, although the flotation operation may, if desired, be facilitated by the presence within the body of the liquor of finely divided gas bubbles having a selective affinity for the floatable solid particles. The settled and floating solids are mechanically and positively worked or moved toward a common discharge region within the body of the liquor and are withdrawn therefrom in any appropriate manner.

The method of the invention lends itself well to continuous operation. Thus, the combined operations of sedimentation and flotation may be continuous, and the collection of the combined floated and settled solids may be continuous, and a resulting effluent of substantially clear liquor may be withdrawn in a practically continuous manner. The supply of fresh liquor and the removal of the combined solids may also be continuous, or these particular operations may be intermittently carried out at periodic intervals without interfering with or interrupting the continuity of the operation as a whole.

In the accompanying drawings and the following description, I have illustrated and described in some detail the best embodiment of my invention of which I am now aware. In the drawings—

Figure 1 is a sectional elevation of an apparatus embodying the invention;

Fig. 2 is a plan view of the same apparatus with the superstructure removed; and Fig. 3 is a detail cross section taken on the section line 3—3 of Fig. 2.

Referring to Fig. 1 of the accompanying drawings, there is illustrated a sedimentation tank or basin 5. As represented in this figure, the sedimentation tank is set or built in an excavation or pit in the ground, the ground level being only slightly lower than the top of the tank. When treating sewage and trade waste waters, it is generally desirable to thus arrange the sedimentation tank in the ground, and in such cases the provision of piping or moving parts beneath the basin is impracticable.

The sedimentation basin is represented in Fig. 1 of the drawings as constructed of concrete or cement. It will, of course, be understood, however, that the basin may be constructed of any material suitable for the liquors to be treated therein. As represented in Fig. 1, the bottom of the basin slopes gradually toward the center, but I wish it to be understood that this is not an essential feature of the apparatus, since the bottom may, if desired, be substantially flat.

A revolving sludge-collecting mechanism is operatively suspended in the tank 5. This mechanism comprises a central vertical shaft 6, to the lower end of which are secured radial arms 7 equipped with plows 8 for directing or moving the sediment of sludge of the settleable solids toward the center of the basin, when the mechanism is slowly rotated. Radial supporting rods or stays 9 are secured at their inner ends to the shaft 6, and at their outer ends to the arms 7, and serve to support the arms 7 in suitable spaced relation with the bottom of the tank 5.

The shaft 6 is rotatably supported by a suitable framework or superstructure 10 mounted above the top of the tank 5. The shaft may be rotated in any suitable manner and in the accompanying drawings I have shown a pulley 11, adapted to be driven from any suitable source of power, secured to a shaft having a worm 12 meshing with a worm gear 13 secured to the vertical shaft 6 near the upper end thereof.

The shaft 6 is journaled in a stationary thrust bearing 14 which supports the entire weight of the rotating mechanism. A guide bearing 15 is mounted on the framework 10 for maintaining the shaft 6 in its proper operative position. A lifting device comprising the yoke 15' and coöperating threaded upper end 16 of the shaft 6, of well known construction, is provided for vertically adjusting the position of the shaft, so that the plows 8 may be raised and lowered and held at any desired level.

Surrounding the shaft 6, and concentric therewith, is a sludge well or solids discharge region 17, having a substantially cylindrical upper portion 17' and a downwardly flared or conical lower portion 17" resting on the radial arms 7. The lower end of the cylindrical member 17' is telescoped over a cylindrical collar on the upper end of the conical chamber 17" and the coinciding portions of these two members are secured to the supporting rods 9. The sludge well is by this construction rigidly and firmly secured to the revolving mechanism, and there is little or no danger of the well becoming dislocated during the normal operation of the apparatus. The sludge well 17 is in communication, through its enlarged open bottom, with the sludge or settled solids worked toward the center of the tank by the revolving sludge-collecting mechanism. The top of the sludge well is open so that any bulky objects finding their way into the well may be grappled from above, and removed. Being open at the top, it will be observed that the atmospheric pressure on the sludge in the well is the same as the atmospheric pressure on the material in the tank and outside the well, of which circumstance I take advantage in inducing a flow of sludge or settled solids from the tank into the well, as will be hereinafter described. The cylindrical upper portion 17' of the sludge well extends upwardly within the basin and terminates a slight distance above the normal liquor level in the basin, whereby floating solids are readily discharged into the upper open end of the portion 17' by the coöperating skimming members 18 and 22, as will be fully explained hereinafter.

An involute skimming member 18 is operatively secured to the rotatable mechanism hereinbefore described, and is arranged to sweep floating solids toward the center of the sedimentation tank or basin when the rotating mechanism is slowly revolved. As represented in Figs. 1 and 2 of the drawings, the skimmer 18 is maintained under tension in the form of an involute by a tie rod 19 secured between the ends of the skimmer and having an intermediate turn buckle 20. A vertical support 21, mounted on one of the radial arms 7, is secured at its upper end to the outer end of the skimmer 18. The skimmer is also supported by a second vertical support 21' mounted on an adjacent radial arm 7.

A stationary skimming member 22 is secured to the framework or superstructure 10 and is arranged to move the floating solids, directed toward the center of the tank by the revolving skimmer 18, into the top of the sludge well 17. The stationary skimming member 22 is constructed of two component parts, the upper of which is relatively rigid, while the lower is flexible so as to permit the passage through the same of the rotatable skimming member 18. Thus, the upper or rigid portion of the stationary skimming member 22 may conveniently consist of an appropriately curved piece of iron to which are bolted depending pieces 22' of flexible material, such, for example, as rubber belting.

The rotatable skimming member 18 is arranged substantially in the same plane as the water level in the tank or basin 5. The rigid portion of the stationary skimming member 22 is positioned well above the plane of the water level in the tank and sufficiently spaced from the upper surface of the rotatable member 18 to permit the latter to pass freely beneath this rigid portion of the stationary member. The flexible portion of the stationary skimming member 22 depends a slight distance below the surface of the liquor in the tank 5, and is positioned in the path of movement of the rotatable member 18 but due to its flexible character is readily pushed aside to permit the passage of the rotatable member 18. It will thus be seen that floating solids are moved toward the center of the tank by the rotatable skimming member 18 and are directed by the stationary skimming member 22 into the sludge well 17 where they mix with and are removed in combination with the settled solids collecting in the sludge well.

The raw sewage or other waste liquor is supplied to the tank 5 through a feed trough 23, communicating with a main supply trough 24. The feed trough 23 has a longitudinally extending opening 25 near the bottom of one wall thereof through which the liquor passes from the trough into the tank.

The effluent may be collected and removed from the sedimentation basin in any suitable manner. In Figs. 1 and 2 of the drawing I have illustrated an overflow launder of octagonal configuration extending around substantially five-eighths of the circumference of the tank. The inner wall 27 of the overflow launder is slightly higher than the outer wall 28 thereof, so as to provide a scum board for holding back any floating particles, and thus preventing such particles from finding their way into the overflow launder. The lower inner wall 28 of the overflow launder thus determines the level of the liquor in the tank 5. The substantially clear effluent rises in the spaces between the inner wall 28 of the launder and the adjacent wall of the tank 5, and overflows into the launder and is carried away by the effluent outlet 29.

A sludge pipe or conduit 30 depends vertically into the sludge well 17 and is in communication with a pump 31. Both the settleable and floatable solids collecting in the sludge well 17, as hereinbefore explained, are withdrawn upwardly from the sludge well 17 through the solids discharge conduit 30 by means of the pump 31, and in this manner are removed from the tank or basin 5. The level of the sludge in the well 17 is maintained sufficiently low to provide a difference in hydrostatic head between the material outside the well and the sludge in the well for inducing a flow of sludge from the tank into the well. This particular arrangement for withdrawing sludge from a sedimentation basin is fully described and claimed in my Letters Patent of the United States No. 1,337,094, dated April 13, 1920, and need not be further discussed herein.

In accordance with the method of the present invention, as practised in the apparatus illustrated in the drawings, the raw sewage or other waste liquor may be continuously supplied to the sedimentation tank or basin through the feed trough 23. In the basin the liquor is subjected to a combined sedimentation and flotation treatment whereby the settleable solids sink toward the bottom of the basin and are worked toward the sludge well or solids discharge region 17 by the rotating plows 8, while the floatable solids rise to the surface of the liquor and are directed toward and into the sludge well or solids discharge region 17 by the coöperating action of the rotatable skimmer 18 and the stationary skimmer 22. The direction of rotation of the rotatable mechanism for performing these respective functions is indicated by the arrow in Fig. 2 of the drawings. The combined floatable and settleable solids collecting in the discharge region 17 are removed together through the solids discharge conduit 30. The substantially clear effluent overflows into the peripheral launder 26 and may be withdrawn therefrom in any convenient manner.

I claim:

1. The method of removing floatable and settleable solids from a liquor containing the same, which comprises subjecting the liquor to a combined sedimentation and flotation treatment, mechanically working the settled and floating solids toward a common discharge region, and removing the settled and floated solids in combination from said region; substantially as described.

2. The method of removing floatable and settleable solids from a liquor containing the same, which comprises subjecting the liquor to a combined sedimentation and flotation treatment, mechanically working the settled and floating solids toward a common discharge region which communicates with said liquor only at or near the bottom and top of the body of liquor undergoing the aforementioned sedimentation and flotation treatment, and removing the settled and floated solids in combination from said region; substantially as described.

3. The method of removing floatable and settleable solids from a liquor containing the same, which comprises subjecting the liquor to a combined sedimentation and flotation treatment, mechanically working the settled and floating solids toward a common discharge region, and withdrawing the combined settled and floated solids collecting in said discharge region upwardly and removing the same from the liquor; substantially as described.

4. The method of removing floatable and settleable solids from a liquor containing the same, which comprises subjecting the liquor to a combined sedimentation and flotation treatment, mechanically working the settled and floating solids toward a common discharge region which communicates with said liquor only at or near the bottom and top of the body of liquor undergoing the aforementioned sedimentation and flotation treatment, and withdrawing the combined settled and floated solids collecting in said discharge region upwardly and removing the same from the liquor; substantially as described.

5. The method of removing floatable and settleable solids from a liquor containing the same, which comprises supplying the liquor to be treated to a body of the liquor, subjecting the body of liquor to a combined sedimentation and flotation treatment, continuously working the settled and floating solids by positively actuated mechanical motions toward a common discharge region within said body of liquor and communicating therewith only at or near the bottom and top thereof, withdrawing the combined settled and floated solids collecting in said region, and continuously removing the resulting effluent from said body of liquor; substantially as described.

6. An apparatus for removing floatable and settleable solids from a liquor containing the same, comprising a sedimentation basin having a solids discharge region, means for directing both the settled and floating solids toward said discharge region, and positively actuated mechanical means for removing the combined settled and floated solids from said region; substantially as described.

7. An apparatus for removing floatable and settleable solids from a liquor containing the same, comprising a sedimentation basin having a centrally disposed solids-discharge region which communicates with said basin only at or near the bottom and top of the body of liquor undergoing treatment therein, positively actuated mechanical means for working the settled solids toward the bottom of said region in combination with means for moving the floating solids toward the top of said region, and means for removing the combined settled and floated solids from said discharge region; substantially as described.

8. An apparatus for removing floatable and settleable solids from a liquor containing the same, comprising a sedimentation basin having a centrally disposed solids discharge region, a positively actuated rotatable mechanism for working the settled solids toward the bottom of said region, means operatively associated with said mechanism for moving the floating solids toward the top of said region whereby the settled and floated solids are both collected in said discharge region, and means for removing the combined floated and settled solids from said region; substantially as described.

9. An apparatus for removing floatable and settleable solids from a liquor containing the same, comprising a sedimentation basin having a solids discharge region, positively actuated mechanical means for working both the settled and floating solids toward said discharge region, and means for removing the combined settled and floated solids collecting in said discharge region upwardly and over the top of said basin; substantially as described.

10. An apparatus for removing floatable and settleable solids from a liquor containing the same, comprising a sedimentation basin having a centrally disposed sludge well which communicates with said basin only at or near the bottom and top of the body of liquor undergoing treatment therein, a rotatable mechanism for working the settled solids toward the bottom of said well in combination with means for moving the floating solids toward and into the top of said well, and means for withdrawing the combined settled and floated solids collecting in said well upwardly and removing the same from the basin; substantially as described.

11. An apparatus for removing floatable and settleable solids from a liquor containing the same, comprising a sedimentation basin having a centrally disposed sludge well, a rotatable mechanism for working the settled solids toward said well in combination with means for moving the floating solids toward and into said well, a discharge conduit depending into said well, and means for withdrawing upwardly through said conduit the combined settled and floated solids collecting in said well; substantially as described.

12. An apparatus for removing floatable and settleable solids from a liquor containing the same, comprising a sedimentation basin having a centrally disposed sludge well, a rotatable mechanism provided with means arranged within said basin and in proximity to the bottom thereof for working the settled solids toward said well, means secured to said mechanism and coöperating with stationary means for moving floating solids into said well, and means operatively associated with said well for withdrawing therefrom the combined settled and floated solids collecting therein; substantially as described.

13. An apparatus for removing floatable and settleable solids from a liquor containing the same, comprising a sedimentation basin, a revolving sludge collecting mechanism operatively arranged within said basin, a sludge well within said basin communicating with the bottom thereof and disposed around the axis of rotation of said mechanism, a skimming member secured to said mechanism and coöperating with a stationary skimming member for moving the floating solids into said well, and means operatively associated with said well for upwardly withdrawing therefrom the combined settled and floated solids collected therein; substantially as described.

14. An apparatus for removing floatable and settleable solids from a liquor containing the same, comprising a sedimentation basin having a solids discharge well which communicates with said basin only at or near the bottom and top of the body of liquor undergoing treatment therein, a revolving sludge-collecting mechanism operatively arranged within said basin for working the settled solids toward the bottom of said well, a skimming member of involute configuration secured to said mechanism in substantially the plane of the liquor level in said basin and adapted to direct floating solids toward the top of said well, a stationary skimming member coöperating with said rotatable skimming member for working floating solids into said well, means for removing the combined settled and floating solids collecting in said well, and means for withdrawing the overflow effluent from said basin; substantially as described.

15. An apparatus for removing floatable and settleable solids from a liquor containing the same, comprising a sedimentation basin having a solids discharge region, means for directing both the settled and floating solids toward said discharge region, means for withdrawing the settled and floated solids from said region, and an overflow launder positioned in proximity to the periphery of said basin and having an inner scum board for holding back floating solids and a lower outer wall permitting the overflow of the effluent from said basin into the launder; substantially as described.

In testimony whereof I affix my signature.

CHARLES LEE PECK.